Figure 1:
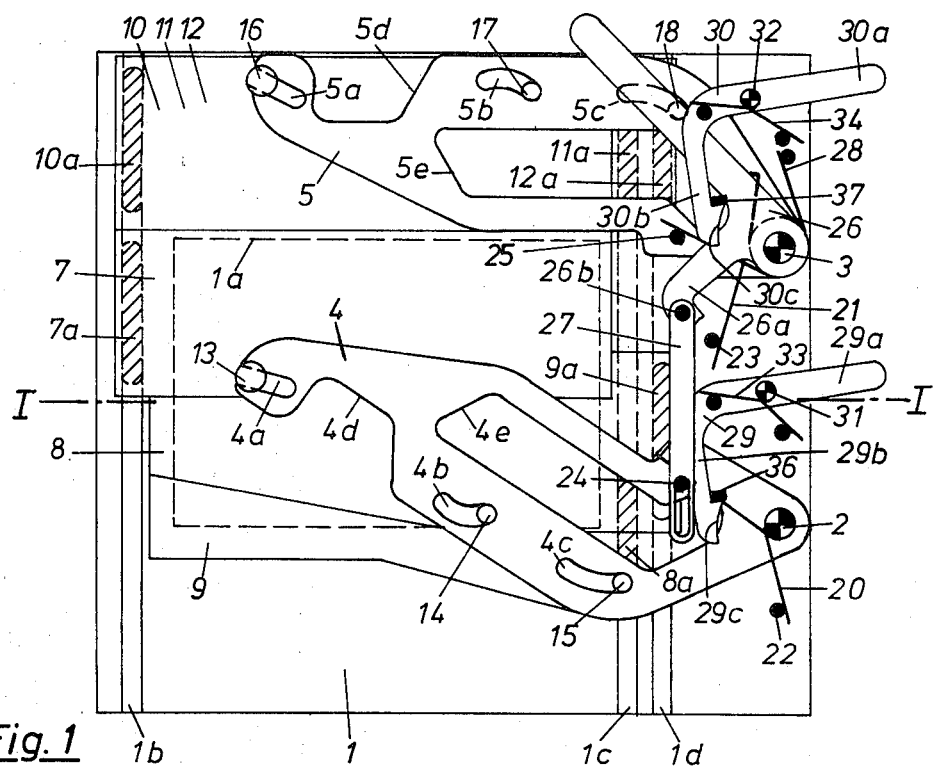

United States Patent
Bott et al.

[11] 3,984,853
[45] Oct. 5, 1976

[54] FOCAL-PLANE SHUTTER STRUCTURE FOR PHOTOGRAPHIC CAMERA

[75] Inventors: Reinhold Bott; Dieter Rittmann, both of Wildbad, Germany

[73] Assignee: Prontor Werk, Wildbad, Germany

[22] Filed: Mar. 10, 1975

[21] Appl. No.: 556,620

[30] Foreign Application Priority Data
Mar. 13, 1974 Germany............................ 2411936

[52] U.S. Cl.................................. 354/246; 354/249
[51] Int. Cl.² ........................................ G03B 9/42
[58] Field of Search ........... 354/241, 242, 246, 248, 354/249, 251

[56] References Cited
UNITED STATES PATENTS

| | | | |
|---|---|---|---|
| 3,672,282 | 6/1972 | Yamada | 354/242 |
| 3,825,940 | 7/1974 | Hayami | 354/241 |
| 3,864,713 | 2/1975 | Kitai et al. | 354/246 |

Primary Examiner—L. T. Hix
Assistant Examiner—James LaBarre
Attorney, Agent, or Firm—Arthur A. March

[57] ABSTRACT

The described invention relates to a focal-plane shutter for a photographic camera. This shutter is a slide system having a plurality of parts which move in timed sequence during exposure. The parts include a plurality of sliders which are displaceable relative to one another.

This invention provides a form of focal-plane shutter for a photographic camera wherein there are slide systems which function during exposure in timed succession with each system having a plurality of slides which are movable relative to one another. Each of the slide systems has a driven element which is rectilinearly guided by a single rotatably mounted part held in operational engagement with each individual slide system in such a manner that the slide participating in forming the focal-plane slit width engages its driving part at a point which is at the maximum possible radial distance from the axis of rotation. There is a straight first guide located close to this point and other slides of the system which operationally engage with their respective driving part at a shorter radial distance corresponding to the extent of movement of such slide. Other slides engage straight second guides which are nearer to the axis of rotation of the driving part than the first guide.

This provides a focal-plane slide shutter which has a simple structure in that each slide system includes several slides which require only a single driving lever operationally engaged with all slides. This makes possible a substantially greater ease of operation, as well as a substantially reduced exposure time.

7 Claims, 7 Drawing Figures

FOCAL-PLANE SHUTTER STRUCTURE FOR PHOTOGRAPHIC CAMERA

The invention relates to a focal-plane shutter for a photographic camera having a shutter slide system in which the parts move in timed succession during exposure, the said parts including a plurality of sliders which are displaceable relative to one another.

In focal-plane shutters of the above kind, in which the sliding opening and closing members are reciprocable without additional crossheads, rotatable guide rods have hitherto been used which are mounted on one side of the film gate on a base plate; they extend parallel to one another and always move in the same direction with respect to one another. In these known sliding shutters the slide system has three slides; the film gate slides including one of the cover slides are connected to parallelogram guide rods, while a further slide located between these two slides is connected to the guide rods by additional lever-like guide members. Such a focal-plane shutter has the disadvantages of a considerable number of parts necessary for the parallel guidance of the slides and also a considerable weight to be accelerated during the action of the shutter.

Focal-plane slide shutters are known using only two slide systems, wherein the guide rods serving to guide and drive the slides are rotatably mounted on either side of the film gate and are interengaged by a coupling rod so that they always move in opposite directions and hence execute a relative displacement of the slides with respect to the film gate, and relative one another.

A principal disadvantage inherent in this known slide drive is that it involves the use of several guide rods, and additionally requires a coupling rod, which increases the weight of the moving parts. A further objection in connection with such systems comprising only two slides is that the design results in a relatively great overall height of the shutter assembly, which means that such a focal-plane shutter cannot be installed in a miniature camera or a camera of compact structure in which shutter height is subject to close limitation.

This disadvantage is also inherent in a focal-plane slide shutter in which an opening and closing system is used consisting of only a single slide, the slide being guided in two ledges, with rods extending parallel to one another, and adapted to be driven either by a tension spring directly engaging the slide, or by a lever. Experience shows that with such a two-sided guidance of the slide, forces normal to the path of movement occur, tending to cause tilting, when the driving force is displaced from the center of gravity of the slide; it follows that this slide guidance and driving principle is usable only in connection with shutter arrangements the covering systems of which include only one slide.

Again, focal-plane shutters of this kind can be fitted only in cameras in which the overall height is of no great significance. It is self-evident that cover systems comprising only one extremely wide slide which must be wider than the film gate, presuppose a correspondingly wide film gate frame. Reduced dimensions may be obtained with multiple slide cover systems of focal-plane shutters, which require a considerably less width of frame.

It is the principal object of the present invention to avoid the disadvantages of known focal-plane slide shutters and, at the same time, to provide a shutter arrangement formed of a plurality of slides having a particularly simple structure with relatively few components to provide a mode of operation which is reliable, and having dimensions suitable for installation in miniature cameras.

According to the present invention there is provided a new form of focal-plane shutter for a photographic camera. This shutter has slide systems which function during exposure in timed succession, with each system having a plurality of slides displaceable relative to one another. Each of the slide systems is driven and guided rectilinearly by a single rotatably mounted part in operational engagement with each individual slide system in such a manner that the slide participating in forming the focal-plane slit width engages its driving part at a point which is at the maximum possible radial distance from the axis of rotation of the said part, a straight first guide being located close to the said point, while the other slides of the system are operationally engaged with their respective driving part at a shorter radial distance corresponding to the extent of movement of the said other slides. The said other slides engage with straight second guides which are nearer to the axis of rotation of the driving part than the first guide. Such a construction provides a focal-plane slide shutter which has a simple structure, since each slide system including several slides requires only a single driving lever operationally engaged with all the slides. Because of the resultant reduction of masses to be accelerated during exposure, and the geometric association between the straight guides of the individual slides and the point of engagement of the driving lever with the slides, tilting moments on the slides are substantially avoided and hence the frictional resistance occurring in the guides is reduced to a value which permits extremely short exposure times of the order of 1/2000th second.

According to a feature of the invention, a first one straight guide for the focal-plane forming slides of both slide systems is located at one side of the film gate or exposure aperture of the camera. The second straight guides of the further slides are located on the other side of this gate or exposure aperture. Hence it is possible to limit substantially the lateral extension of the shutter base plate, and provide a slide shutter arrangement which is distinguished from known focal-plane slide shutters both by a low overall height and by a small overall width.

To avoid expenditure in guiding means for guiding the individual slides of the slide systems it is proposed to use grooves formed in the base plate as straight guides and to use ledges located on one side of the slides and engaging therein as guiding elements. A substantial advantage resulting from such a construction is that they absorb any transverse forces without noticeably increasing the frictional resistance of the straight guides.

Good results with regard to salient action of the slide systems may be obtained by making the ledges of plastics material and securing them to the slides by rivets. Moreover the use of plastics material ledges contributes substantially to the reduction of sliding friction in the slide guides. It is further proposed that the component used for the joint drive of each slide is a lever with cut-outs formed therein.

According to a further feature of the invention a tension lever acting simultaneously on both blade systems is used for transferring the slide or its driving lever into the cocked position. A structurally simple embodiment may be attained by arranging that the opening system, which accompanies the closing system during cocking, is operationally connected to the cocking lever via a tension strap.

Figure 2:
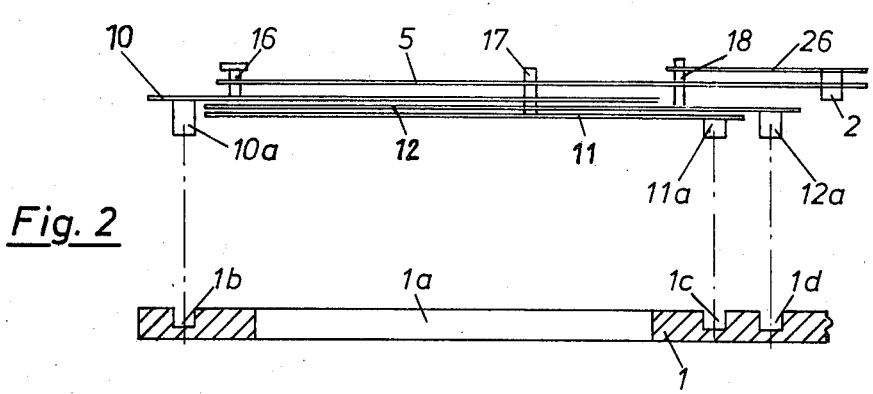
Figure 6:
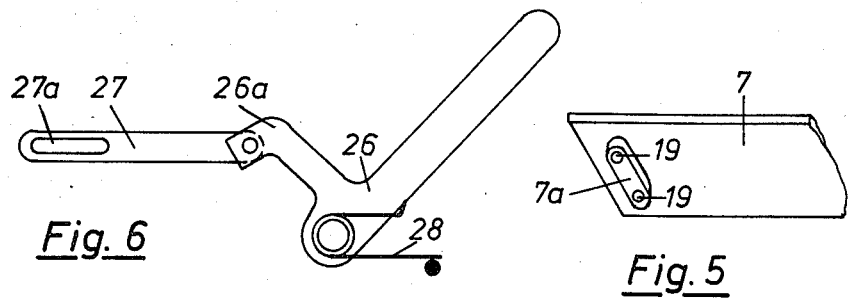
Figure 5:
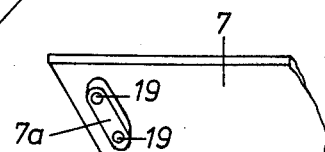
Figure 3:
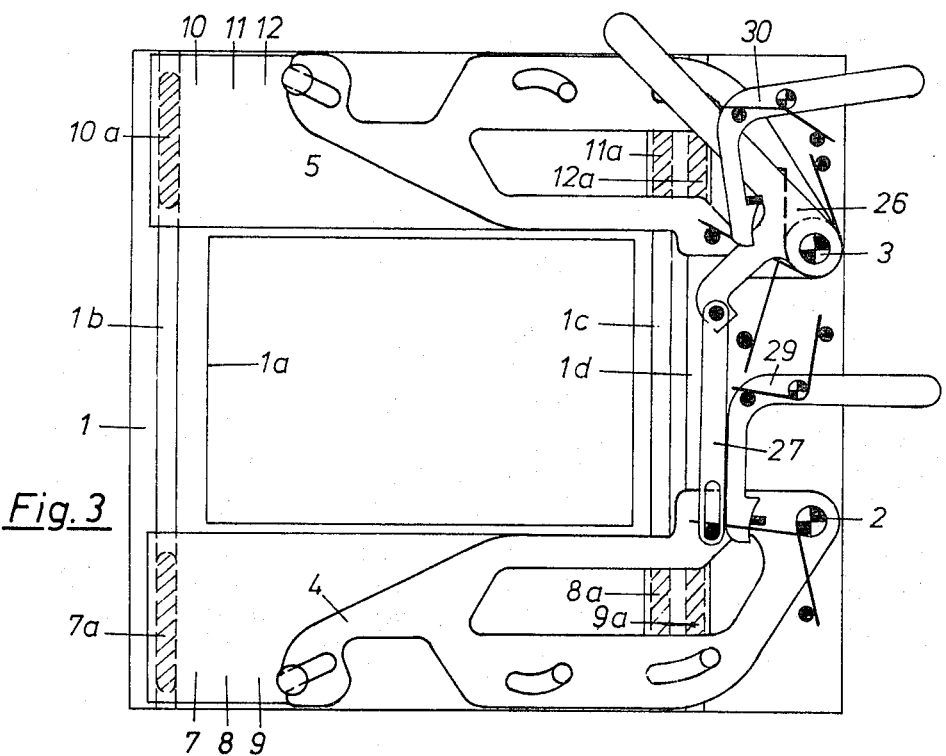
Figure 4:
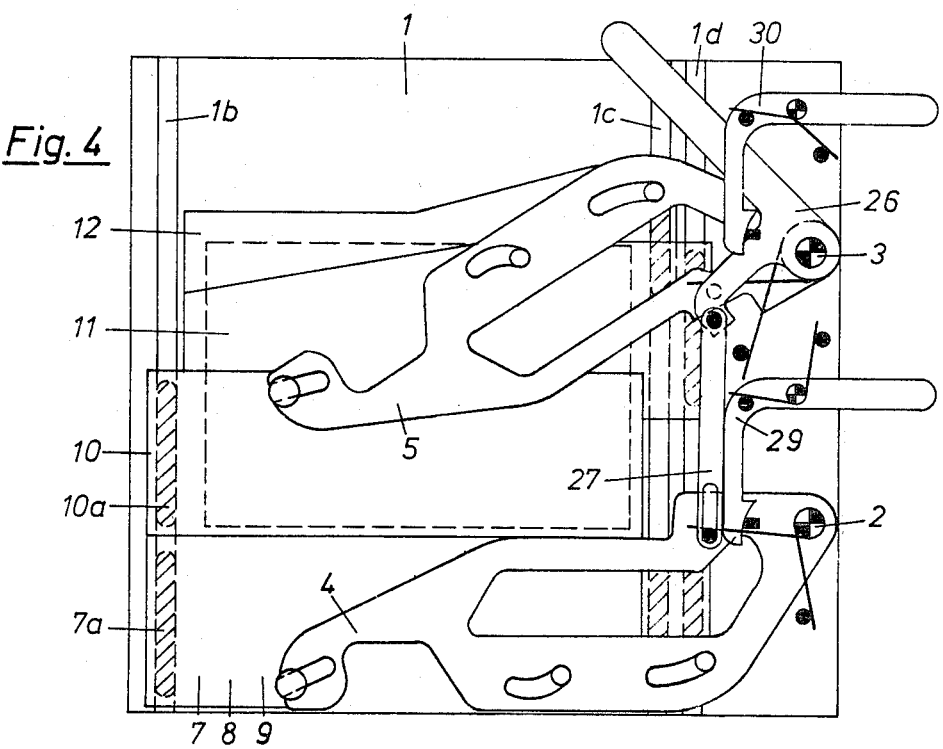
Figure 7:
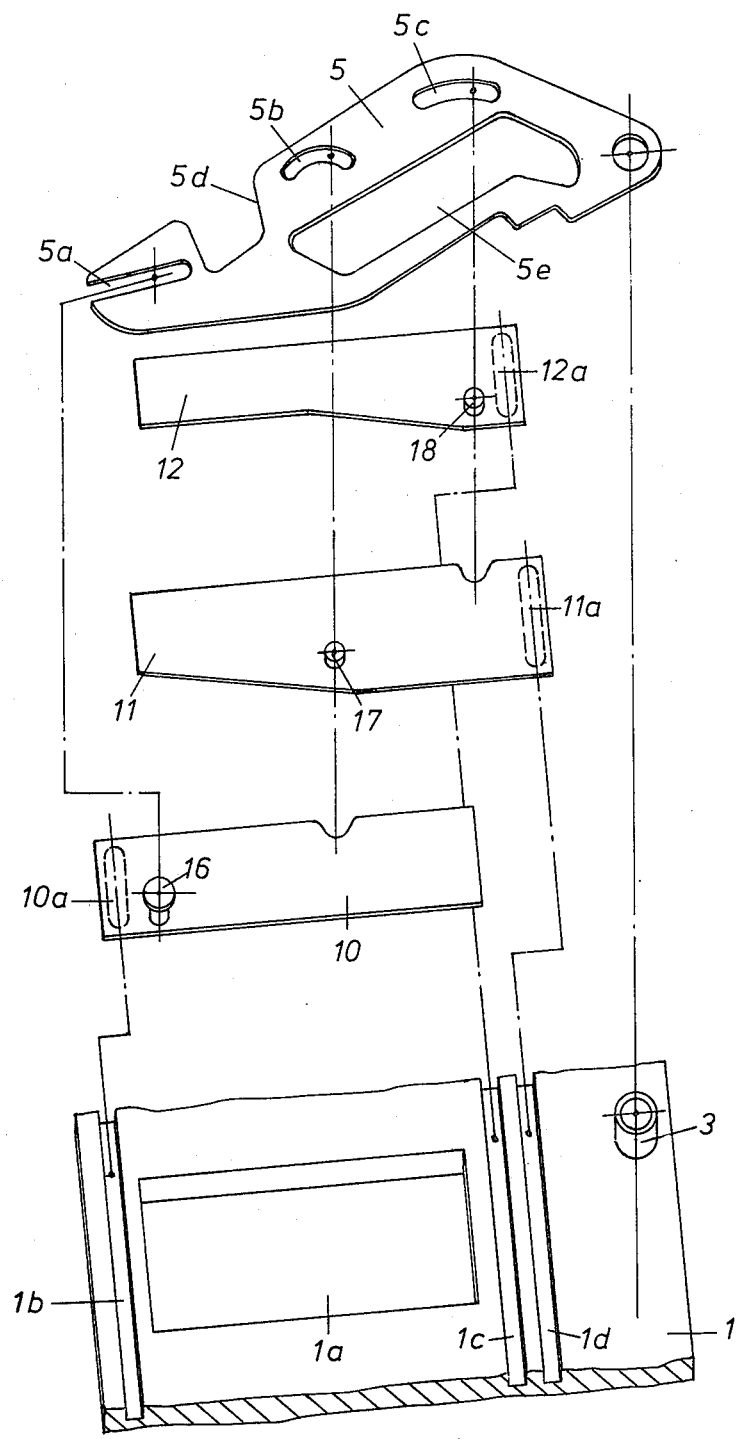

An embodiment of the invention is set forth in detail with reference to the accompanying drawings, in which:

FIG. 1 shows a focal-plane slide shutter in plan view, in a cocked position,

FIG. 2 shows a side exploded view of the closing system of the shutter assembly, including the base plate, which is shown in cross-section along the line I—I in FIG. 1, FIG. 3 shows the shutter assembly with the opening system run off to expose the film gate, FIG. 4 shows the shutter assembly after the film gate is covered by the following closing system, FIG. 5 is a partial perspective view of a slide having a guide ledge of plastics material riveted thereon, FIG. 6 shows the lever arrangement for transferring the two slide systems into a cocked position, and FIG. 7 shows the closing system of the shutter assembly in an expanded view, with the base plate only partially shown, and the driving member operationally connected with the slides of the closing system; chain-dotted lines indicate the engagement of the ledge located on the slide in its groove in the base plate, and the co-operation of the coupling means between the slides and the driving member.

In the drawing, the base plate of the slide focal-plane shutter formed as a complete unitary structure is denoted by 1, and the film gate or exposure aperture in this plate by 1a. Pins 2 and 3 rotatably mount two congruent and lever-like members 4 and 5, these members moving a slide system formed of several sliders 7, 8 and 9 or 10, 11 and 12 mounted so as to be movable relative to one another. The operational engagement of each individual slide with the driving lever 4 or 5, is effected by means of pin and slot guides; coupling pins 13, 14, 15, 16, 17, 18 as shown especially in FIGS. 1 and 7, are located on the respective slide 7, 8, 9, 10, 11 or 12, and engage slots 4a, 4b, 4c, or 5a, 5c, formed on the driving levers 4 or 5.

For each of the slides 7, 8, 9, 10, 11 or 12, of the slide systems a straight guide is provided which is formed as a groove 1b, 1c or 1d. Guide rods, from a purely functional point of view, would fulfill the same object, but would require a greater amount of material. For reasons of functional and manufacturing advantages the grooves 1b, 1c or 1d machined in the base plate 1 of the shutter, receive guide ledges 7a, 8a, 9a or 10a, 11a, 12a or cams, rollers or the like located on the underside of the slides. Particularly favourable results with regard to guiding properties and salient movement actions of the slide systems may be attained by making the ledges 7a, 8a, 9a, or 10a, 11a, 12a of plastics material. As shown in FIG. 5, these are secured by rivets 19 to the respective slides.

Since the slides 7 and 10 of the opening and closing system forming the exposure focal-plane have always to cover (traverse) the maximum length of path, each individual slide engages its driving lever 4 or 5 at a point as remote as possible from its pivot or bearing pin 2 or 3. The further slides 8, 9 or 11, 12 associated with the previously mentioned slides forming the focal-plane shutter, are connected at a shorter radial spacing from the pivotal axis 2 or 3 of the driving lever 4 or 5, corresponding to their shorter movement path. The arrangement of the grooves 1b, 1c and 1d providing additional guidance for the individual slides 7 to 9, or 10 to 12, with respect to the points of engagement of the movement forces provided by the coupling connections with the levers 4 or 5, is so chosen that any tilting moments adversely influencing the movement of the individual slides, are substantially avoided or minimized. For this purpose, the path of the groove 1b serving the focal-plane forming slides 7 and 10, is located as closely as structurally possible to the circular movement path of the pin 13 or 16 connecting this slide with the respective driving lever 4 or 5, while the grooves 1c and 1d provided for the two trailing slides 8 and 9 or 11 and 12, are located adjacent to the movement paths of the coupling pins 14 and 15, or 17 and 18. In this manner one guide groove 1b associated with the focal-plane shutter forming slides 7 and 10 is located on one side of the film gate 1a, and the two other guide grooves 1c and 1d for the further slides 8 and 9 or 10 and 12 are located close together on the other side of the film gate 1a.

The two levers 4 and 5 operationally engaged with the slides 7 to 9 and 10 to 12 are driven by tension springs 20 and 21, which are each mounted on a pin 2 or 3. One end is supported against a fixed pin 22 or 23, and the other end against a pin 24 or 25 secured to the respective driving lever 4 or 5. The slide systems 7 to 9 and 10 to 12 are moved into the cocked position shown in FIG. 1 by means of a lever 26 mounted coaxially with the bearing pin 3 of the closing system 10 to 12. This lever is acted upon by a spring 28 which tends to move it in an anti-clockwise direction around the pin 3. The lever 26 has an extension 26a which engages with the pin 24 serving the spring support by means of a tension strap 27 articulated thereto by means of a pin 26b such that when the lever 26 is actuated, both the driving lever 4 moving the opening system 7 to 9 and the driving lever 5 for the closing system 10 to 12 are transferred from the position shown in FIG. 4 to that shown in FIG. 1. During this movement the tension strap 27 co-operating with the pin 24 engages the lever 4, while the hinge pin 26b striking laterally against the lever 5, moves this part into the cocked position. To provide the driving lever 4 acting on the opening system 7 to 9 the necessary freedom of movement to expose the film gate 1a, a slot 27a (FIG. 6) is formed in the tension strap 27, the length of which corresponds to the distance covered by the pin 24 during the deflecting movement of the driving lever 4. During the cocking operation, the cocking lever 26 has to execute a corresponding excess movement to such a position as to enable the locking of the driving levers 4 and 5, from which position it returns under the influence of the spring 28 engaging thereon into a position in which the strap 27, as shown in FIG. 1, rests against the pin 24. If later on the driving lever 4 of the opening system 7 to 9 is released to expose the film gate, this lever is able to execute an unobstructed rotary movement in an anti-clockwise direction.

The two driving levers 4 and 5 are each retained in a cocked position by means of a respective locking lever 29 or 30. Each of these levers, as shown in FIGS. 1, 2, 3 and 4 of the drawings, is rotatably mounted on a fixed bearing pin 31 or 32, and can be moved out of the locking position shown in FIG. 1 against the action of a spring 33 or 34, when a force moving the lever in a clockwise direction acts on the lever arm 29a or 30a. The further arm 29b or 30b of the locking lever 29 or 30 co-operating with the driving lever 4 or 5, is hook-shaped and in the cocked position of the respective slide system engages a stop lug 36 or 37 located on the driving lever 4 or 6. The arrangement of the components is such that the stop lug 36 or 37, both during the to and the fro movement of the driving lever 4 or 5, slides along a concave support edge 29c or 30c formed on the outer end of the locking lever arm 29b or 30b. The driving levers 4 and 5 are of relatively large area and so are provided with cut-outs 4d and 4e or 5d and 5e in order to reduce the masses of the individual slide systems which have to be accelerated during the exposure operation. This enables extremely short exposure times to be provided.

The operation of the afore-described focal-plane slide shutter corresponds to that of known focal-plane shutters with slide systems which run off in timed succession. Actuation of the locking lever 29a by means of the camera mechanism first releases the opening system 7 to 9 which opens the film gate, followed by the closing system 10 to 12 to produce a wide or narrow exposure slot, after a greater or lesser time interval controlled by a mechanical or electric timing device.

Having now described the invention, what is claimed is:

1. A focal-plane shutter for a photographic camera having an exposure aperture, comprising:
   a pair of slide systems which run off during exposure in timed succession, each said system having a plurality of slides displaceable relative to one another including one slide forming the focal plane slit width and other slides disposed in parallel planes in partially overlapping relation and closing an exposure aperture,
   means to drive and rectilinearly guide each slide of the said slide systems respectively,
   said means comprising respectively for each said system a corresponding single rotatably mounted driving part in operational engagement with each individual slide of the system so that the said one slide thereof participating in forming the focal-plane slit width engages the said driving part at a point which is at the maximum possible radial distance from the axis of rotation of the said rotatably mounted driving part, a straight first rectilinear guide to engage the said one slide and operatively disposed close to the point of driving, means for engaging the said other slides of the corresponding system operationally with the same said driving part at a shorter radial distance which corresponds to the extent of movement of the said other slides, and straight second guides to engage the said other slides and operatively disposed nearer to the axis of rotation of the driving part than the said first rectilinear guide.

2. A focal-plane shutter according to claim 1, wherein the corresponding straight first guides for the focal-plane slit forming slides of the two slide systems are located on one side of the shutter relative to a camera exposure aperture and the corresponding straight second guides of the said other slides are located on the other side of the shutter relative to an exposure aperture.

3. A focal-plane shutter according to claim 2 wherein a base plate is provided, wherein the straight first and second guides are formed as corresponding grooves in the said base plate, and wherein guide elements formed as ledges and located only on one side of the respective slides are provided corespondingly to engage the said grooves.

4. A focal-plane shutter according to claim 3, wherein the ledges are made of plastics material and rivet means are provided to secure the ledges to the slides.

5. A focal-plane shutter according to claim 1, wherein the said driving part driving said corresponding slide system comprises a driving lever having a cut-out portion provided therein.

6. A focal-plane shutter according to claim 5 wherein a single cocking lever and means to connect the cocking lever to control both slide systems simultaneously are provided for transferring the slides and the driving levers into a cocked position.

7. A focal-plane shutter according to claim 6 wherein one of the slide systems is arranged to operate for opening a camera exposure aperture and the other of the slide systems is arranged to operate for closing an exposure aperture, means operative during the cocking operation are provided to cause the slide system for opening an exposure aperture to follow operationally the slide system for closing an exposure aperture, and said means to connect the cocking lever to control both slide systems includes a tension strap to bring the cocking lever into operational engagement with the driving lever which drives the slide system for opening an exposure aperture.

* * * * *